United States Patent [19]

Rosskopf

[11] 4,373,956

[45] Feb. 15, 1983

[54] ADDITIVE FOR HYDRAULIC CEMENT MIXES

[75] Inventor: Philip A. Rosskopf, South Euclid, Ohio

[73] Assignee: Martin Marietta Corporation, Bethesda, Md.

[21] Appl. No.: 301,904

[22] Filed: Sep. 14, 1981

[51] Int. Cl.$^3$ ................................................. C04B 7/35
[52] U.S. Cl. ..................................... 106/90; 106/104; 106/315
[58] Field of Search ........................... 106/315, 90, 104

[56] References Cited

U.S. PATENT DOCUMENTS 3,782,991  1/1974  Burge ................................. 106/315
4,298,392  11/1981  Isselmann ......................... 106/315

Primary Examiner—James Poer
Attorney, Agent, or Firm—George W. Moxon, II; Gay Chin

[57] ABSTRACT

A hydraulic cement mix including hydraulic cement, aggregate, sufficient water to effect hydraulic setting of the cement, and an additive comprising a mixture of an alkali or alkaline earth or ammonium salt of thiocyanic acid, such as sodium, potassium, lithium, calcium or magnesium thiocyanate, and an alkanolamine, such as triethanolamine, the additive being present in an amount sufficient to increase rate of hardening, and the compressive strength of the hardened mix. Generally, the additive is present in a total amount of up to about 2.5% by weight based upon the weight of the cement, usually in an amount of between about 0.05% and about 2.55% by weight based upon the weight of the cement, preferably in an amount in the range of about 0.4% to about 0.6% by weight.

18 Claims, No Drawings

ADDITIVE FOR HYDRAULIC CEMENT MIXES

BACKGROUND OF THE INVENTION

This invention relates to additive compositions, otherwise known as admixtures, for incorporation in hydraulic cement mixes, for example, hydraulic cement concretes, mortars, and grouts, neat cement mixes, concrete block mixes, and dry mixes for making such concretes, mortars, and grouts, especially to accelerate their rate of hardening and setting.

A variety of techniques have been employed to accelerate the hardening of hydraulic cement mixes. These techniques are employed because of circumstances or conditions that render unduly extended the time required for hardening of such mixes in given applications. The rate of hydration of portland cement is very dependent upon temperature, for example, so that concrete containing it will often harden at a slower rate than desired during the winter season unless provisions are taken to accelerate the hardening process. Among the various techniques employed for this purpose are the increasing of the proportion of portland cement in the mix; the use of the most rapid setting type of cement available; the heating of the water and other components of the concrete; and the use of chemical admixtures that act, catalytically or otherwise, to increase the rate at which the concrete hardens.

A number of chemical agents that serve to accelerate the rate of hardening of concrete are known in the art. Calcium chloride in particular is well known as an effective and economic accelerator. In use, however, this additive is known to have certain disadvantages, principally its tendency under certain circumstances to promote corrosion of metal embedded in, or in contact with, the calcium chloride-containing concrete. Other agents, such as alkanolamines, urea, sodium thiosulfate, low molecular weight aldehydes and their polymers, salts of nitrous and nitric acid, and calcium formate, do not promote corrosion of metal, but have a less pronounced effect in accelerating the rate of hardening of concrete, and aldehydes are known to evolve fumes which have been considered objectionable.

There is a continuing need in the art, therefore, for improved set accelerating agents. In particular, there is a need for new set accelerating agents capable of rapidly accelerating the rate of set of portland cement mixes, which do not promote corrosion of metal embedded, or in contact with, the calcium chloride-containing concrete. In addition, of course, there is a continuing desire in the art for admixtures capable of permitting other advantages, such as reduction of the water content of the mix and improved compressive strength of the hardened concrete.

Another use for accelerators is to overcome retardation caused by strength enhancing admixtures. Many admixtures employed to achieve improved compressive strength are known to act also as set retarders, and such admixtures slow the chemical process of hydration so that the concrete remains plastic and workable for a longer time than concrete without such a retarder. While admixtures having set retarding and compressive strength improving properties are useful per se, frequently there are instances where improved compressive strength is desired but any significant retarding of the rate of hardening of the cement or concrete mix would be undesirable. In such an instance, it is desirable to overcome the undesirable retarding effect, by using accelerators that overcome the retarding tendency.

Thus a need exists for additive compositions, or admixtures, for incorporation in hydraulic cement mixes, which additives will provide improved compressive strength and/or accelerated rate of hardening and setting for the resulting cement products, while not causing adverse effects on the hydraulic mixes, such as unduly entraining air, or producing undesirable fumes or corrosive effects, or decreased strength at later ages.

SUMMARY OF THE INVENTION

The present invention is an additive composition or admixture for incorporation in hydraulic cement mixes, such as concretes, mortars, and grouts, neat cement mixes, nonplastic cement mixes, and dry mixes for making concretes, mortars, and grouts and thus the improved cement mixes and process for incorporating the additive composition.

For the purposes of this invention, the term "hydraulic cement" is intended to mean and to include all cementious compositions capable of being set and hardened by the action of water, such as portland cements, sulphate-resisting cements, blast-furnace cements, pozzolanic cements, and high-alumina cements, since the additive composition or admixture of the present invention can be incorporated into all hydraulic cement mixes. But the preferred use of the present composition or admixture is in portland cement mixes. Also for the purposes of this invention, the term "portland cement" is intended to include all cementitious compositions which have a high content of tricalcium silicate and thus are portland cement or are chemically similar or analogous to and thus portland type cement, the specification for which is set forth in American Society for Testing Materials specification (ASTM) C-150-80. This would include cements, in which flyash, such as from steam or power generating stations, limestone, pozzolana slag, such as from blast furnaces, or mixtures of these, are incorporated and are considered portland cements, or portland blended cements such as those in ASTM C-595-79.

Broadly, the invention comprises a hydraulic cement mix including hydraulic cement, aggregate, sufficient water to effect hydraulic setting of the cement, and an additive comprising a mixture of an alkali or alkaline earth or ammonium salt of thiocyanic acid and an alkanolamine, the additive being present in an amount sufficient to increase rate of hardening, the workability and the compressive strength of the hardened mix. The additive is preferably selected from the group comprising sodium, potassium, lithium, calcium, magnesium or ammonium thiocyanate, in combination with triethanolamine, and is present in a total amount of up to about 2.5% by weight based upon the weight of the cement, generally in an amount of between about 0.1% and about 2.55% by weight based upon the weight of the cement, preferably in an amount in the range of about 0.4% to about 0.6% by weight. Use of the additive is beneficial to the engineering properties of hydraulic cement mixes in that it results in products having an accelerated rate of hardening and setting over similar mixes prepared without the additive, without causing the corrosion problems present with chloride accelerators, such as calcium chloride. Further, use of this additive in portland cements within the preferred ranges generally results in an increase in the compressive strength of the hardened hydraulic cement mixes.

It is therefore an object of the present invention to provide improved hydraulic cement mixes.

It is another object of this invention to provide improved hydraulic cement mixes, such as portland cement mixes, including concrete, mortar and grout mixes, neat cement mixes, nonplastic cement mixes, and dry mixes, which include an additive composition or admixture which will advantageously accelerate the rate of hardening and setting of the cement mix and/or increase the early compressive strength.

DETAILED DESCRIPTION OF THE INVENTION

The alkali and alkaline earth salts of thiocyanic acid have the following general formula:

$$R(SCN)_x$$

wherein R represents an alkali or alkaline earth metal, such as sodium, potassium, lithium, calcium or magnesium, or ammonium and X is 1 depending upon whether R is an alkali metal or ammonium, and X is 2 when R is an alkaline earth metal. Thiocyanate salts are also variously known as sulfocyanate, sulfocyanide, rhodanate, and rhodanide salts. Thiocyanate salts are commercially available products and have known utility in the dyeing and printing and textiles industries, as well as a solvent for cellulose and polyacrylate.

Alkanolamine is the generic name for a group of compounds in which nitrogen is attached directly to the carbon of an alkyl alcohol. Ethanolamine, diethanolamine and triethanolamine, alone and in various blends, are well known examples of alkanolamines. For the purpose of this application, the term alkanolamine is intended to mean one of the alkanolamines per se as well as a blend alkanolamine. Triethanolamine, also known as tri-(2-hydroxyethyl) amine and by the formula $(HOCH_2CH_2)_3N$ is a commercially available product and has known utility in detergents and as a cement accelerator.

In the practice of the present invention, the thiocyanate salt and alkanolamine are used in combination and are incorporated in hydraulic cement mixes, such as portland cement concretes and mortars, high alumina cement concretes and mortars, and dry mixes for making such concretes and mortars in amounts sufficient to accelerate the rate of hardening and setting of the hydraulic cement mix. Broadly, the combination will be incorporated in the cement mix in total amount of up to about 2.55% by weight based upon the weight of the cement, usually within the range of 0.1% to 2.55% by weight. Preferably the thiocyanate salt is present in an amount of between 0.1% and 2.5% by weight, based upon the weight of the cement, with the alkanolamine being present in an amount of between 0.001% and 0.05% by weight, based upon the weight of the cement. A further preferred amount of thiocyanate salt is 0.25% to 1.5% by weight, based upon the weight of the cement, and a further preferred amount of alkanolamine is about 0.01% to 0.04% by weight, based upon the weight of the cement. The additive of the present invention is incorporated into hydraulic cement mixes preferably by adding it to a portion of the mix water used for mixing of the hydraulic cement and aggregate. But, the additive could be incorporated in any other convenient manner, including adding it to the dry mix before the water is incorporated therein.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33-80. The precise size, purity, quality, and quantity, or ranges thereof, of the fine and coarse aggregates will vary depending upon the desired use and properties of the mortar or concrete. For most common uses, although not limited thereto, the size of the fine aggregate will be within the broad range of about +4 mesh to −100 mesh U.S. Standard Sieve (ASTM C-11-70), while the size of the coarse aggregate will be within the broad range of 3 inches (7.6 cm) to 4 mesh. The coarse aggregate will usually be of mineral origin, such as gravel or crushed rock, but it may in some cases consist at least partially of graded metallic material such as iron chips, or manufactured aggregate, such as slag.

Further in general for dry mortar mixes, the proportion of fine aggregate to cement will be in the range of about 25% to about 75% by weight based upon the weight of the cement mix, depending upon the nature of the aggregate and the desired properties and use of the mix.

For both the mortars and cements, the amount of water employed generally should be enough to effect hydraulic setting of the cement present in the mix and to provide suitable workability. This may broadly range from about 20% by 60% by weight of the cement in the mix for the mortars and about 25% to 70% by weight of the cement in the mix for the concretes. The precise amounts of water will depend upon the end use of the cement mix, as well as the aggregate and other admixtures present in the mix.

For purposes of illustrating the advantageous results obtainable by the practice of the present invention, plain cement mixes were prepared and compared with similar mixes in which various thiocyanate salts and triethanolamine, both alone and together, were incorporated in varying doseages. The same type and brand of cement was used in each mix, and the proportion and kind of aggregate employed were substantially the same. A sufficient amount of water was added to each mix to effect hydraulic setting of the cement mix and to produce cement mixes of essentially the same consistency. The tests from which the results were derived were those commonly employed and standardized in the ASTM standards for testing cement and/or concrete mixes, including ASTM standards C-39-72 (1979), C-143-78, C-231-78, C-403-77, all of which are incorporated herein by reference. In addition and for the purpose of further illustrating the invention, comparisons were made with calcium chloride (CaCl₂), which is known and commercially available as an accelerating admixture and calcium lignosulfonate, which is a known, retarding, water reducing admixture.

The results shown in Tables I through VI illustrate generally the use of the admixture in accordance with the present invention in two Type I portland cement mixes (where the cements were from two different manufacturers) to form concretes, except for Table I where only one cement (No. 1) was used. For convenience, the tests were run as a series of tests wherein, by comparison to a plain (no admixture) concrete mix, the dosages were varied, various thiocyanate salts were employed, and comparisons were made with known prior art accelerators and a retarding, strength enhancing admixture. The fine aggregate to coarse aggregate ratio was between 0.46 and 0.49, the amount of cement was 420 lbs. per cubic yard (249 kg. per cubic meter) of concrete and the consistencies of the concretes (measured as "slump" in accordance with ASTM C 143-78) were such that they had slumps of 5 inches ±½ inch (12.7 cm.±1.3 cm.).

All of the testing in Tables I, II, IV, VI and VI was done at 70° F.±2° F. (21° C.±1° C.) while that in Table III was done at 50° F.±2° F. (10° C.±1° C.). All of the data shown in the average result of two tests, and in case of Series (B) in Table V, and Table I, the data are the average of four tests, except six members 172 and 182 which are the averages of eight tests. The tests in Table V, Series (B) were part of a random duplicate statistical test which is not relevant here and so will not be discussed. Table I simply involved duplicate tests. But the data do support the invention and is shown as averaged for the convenience of not including more data in this application than is necessary to prove and support the invention.

In each series the rate of set is shown relative to the plain mix in that series, or the first plain mix when there is more than one. The actual rate of set of the plain mix is shown parenthetically. Where two plain mixes are done, the second serves to confirm the first plain mix. In the tables, MEA, DEA and TEA are commercially available alkanolamines, namely monoethanolamine, diethanolamine and triethanolamine, respectively, CaLS is a commercially available calcium lignosulfonate, which is a known water reducing, strength enhancing admixture having set retarding properties, and $Na_2S_2O_3$ is sodium thiosulfate which is a known "non-chloride" accelerator.

As can be seen from Table I, the use of the admixture in accordance with the present invention, namely the combination of a thiocyanate salt and an alkanolamine, produces an accelerated rate of set and an increased one day strength gain, versus each component alone.

TABLE I

| Mix No. | Additive | Dose; percent by weight of cement | Water lbs./cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| Cement No. 1 | | | | | | | | | |
| 1 | NONE | 0 | 340 (202) | 1.8 | 0 (6¼) | 0 (8¾) | 522 (3.6) | 2010 (13.9) | — |
| 2 | NaSCN | 0.01 | 332 (197) | 1.8 | −¼ | −¼ | 589 (4.1) | 2161 (14.9) | — |
| 3 | NaSCN | 0.05 | 330 (196) | 2.0 | −½ | −¾ | 674 (4.6) | 2266 (15.6) | — |
| 4 | NaSCN | 0.10 | 327 (194) | 2.0 | −1 | −1 | 756 (5.2) | 2442 (16.8) | — |
| 5 | NaSCN | 0.50 | 330 (196) | 2.0 | −1¼ | −1¼ | 783 (5.4) | 2502 (17.2) | — |
| 6 | TEA | 0.001 | 330 (196) | 2.0 | −¼ | −¾ | 566 (3.9) | 2070 (14.3) | — |
| 7 | TEA | 0.005 | 328 (195) | 2.0 | −¾ | −¼ | 614 (4.2) | 2184 (15.1) | — |
| 8 | TEA | 0.01 | 326 (193) | 2.0 | −¾ | −¾ | 641 (4.4) | 2206 (15.2) | — |
| 9 | NaSCN + TEA | 0.01 + 0.001 | 330 (196) | 2.0 | −¼ | −¼ | 576 (4.0) | 2078 (14.1) | — |
| 10 | NaSCN + TEA | 0.05 + .001 | 331 (196) | 1.9 | −¾ | −¾ | 619 (4.3) | 2212 (15.2) | — |
| 11 | NaSCN + TEA | .10 + .001 | 328 (195) | 1.8 | −1 | −1 | 748 (5.2) | 2474 (17.1) | — |
| 12 | NaSCN + TEA | .5 + .001 | 326 (193) | 2.2 | −1¼ | −1¼ | 799 (5.5) | 2590 (17.9) | — |
| 13 | NaSCN + TEA | .01 + .005 | 330 (196) | 1.9 | −⅝ | −1 | 642 (4.4) | 2261 (15.6) | — |
| 14 | NaSCN + TEA | .05 + .005 | 329 (195) | 1.9 | −¾ | −1 | 685 (4.7) | 2353 (16.2) | — |
| 15 | NaSCN + TEA | .10 + .005 | 327 (194) | 1.9 | −⅝ | −1¼ | 782 (5.4) | 2410 (16.6) | — |
| 16 | NaSCN + TEA | .5 + .005 | 330 (196) | 2.0 | −1 | −1¼ | 825 (5.7) | 2488 (17.2) | — |
| 17 | NaSCN + TEA | .01 + .010 | 329 (195) | 2.0 | −¾ | −1 | 659 (4.5) | 2177 (15.0) | — |
| 18 | NaSCN + TEA | .05 + .010 | 327 (194) | 2.1 | −1¼ | −1¼ | 777 (5.4) | 2356 (16.2) | — |
| 19 | NaSCN + TEA | .10 + .010 | 328 (195) | 2.2 | −1¼ | −1¼ | 782 (5.4) | 2407 (16.6) | — |
| 20 | NaSCN + TEA | .5 + .010 | 328 (195) | 2.2 | −1¼ | −1⅜ | 922 (6.4) | 2608 (18.0) | — |

Acceleration of rate of set relative to the plain mix is indicated by a minus (−) sign, while retardation is indicated by a plus (+) sign. The parenthetical number for the plain mix is the actual time of set in hours.

Further, the combination can produce approximately the same acceleration of the rate of setting and hardening and early (one day) compressive strength as did calcium chloride at a dosage of 1% by weight based upon the weight of cement, when compared to plain concrete, in which no additive was employed. This is especially brought out in Table II, Series D, which was at 70° F.±2° F. (21° C.±1° C.) and Table III which was done at 50° F.±2° F. (10° C.±1° C.). During colder weather, the rate of set is usually longer and the need for an accelerator is greater. Further, Table II, Series E shows the equivalency of the various thiocyanate salts, while Table IV shows the use of various alkanolamines.

When the admixture of the present invention is used with a set retarding, strength enhancing admixture such as calcium lignosulfonate as shown in Table V, the set retarding feature can be overcome without detrimentally affecting the hydraulic strength of the concrete. The tests shown in Table VI show the thiocynate salt component in combination with known prior art accelerators and the results are not nearly as beneficial as are achieved with the combination of thiocyanate salt and alkanolamine that is taught by the present invention.

It is within the scope of the invention to incorporate, in the cement mixes prepared as herein provided, other additives known in the art for the express purpose for which they are normally employed. Such other additives may, for example, be air-entraining agents, air-detraining agents, pozzolanic materials, flyash, coloring agents, water repellants, strength enhancing admixtures and the like. The accelerators of the present invention may also be employed in conjunction with a combination of such cement additives to produce desired changes in the physical properties of the concrete being produced.

TABLE II

| Mix No. | Additive | Dose; percent by weight of cement | Water lbs/cu.yd (kg/cu.meter) | Air Vol. % | Rate of Hardening Relative To First Plain (None) Mix[1] Hours Initial Set | Final Set | Compressive Strength; p.s.i. (MPa) 1 day | 7 day | 28 days |
|---|---|---|---|---|---|---|---|---|---|
| | | | SERIES A | | | | | | |
| Cement No. 1 | | | | | | | | | |
| 21 | NONE | 0 | 328 (195) | 2.3 | — | 0(8¼) | 657 (4.5) | — | 3813 (26.3) |
| 22 | TEA | .025 | 331 (196) | 2.5 | — | −⅞ | 846 (5.8) | — | 4304 (29.7) |
| 23 | NaSCN | .10 | 324 (192) | 2.5 | — | −⅞ | 927 (6.4) | — | 4100 (28.3) |
| 24 | NaSCN | .25 | 323 (192) | 2.7 | — | −1 | 986 (6.8) | — | 4225 (29.1) |
| 25 | NaSCN | .50 | 321 (190) | 2.8 | — | −1¼ | 1066 (7.3) | — | 4232 (29.2) |
| 26 | NaSCN + TEA | .10 + .0125 | 323 (192) | 2.7 | — | −1¼ | 1017 (7.0) | — | 4065 (28.0) |
| 27 | NaSCN + TEA | .25 + .0125 | 321 (190) | 2.8 | — | −1⅜ | 1087 (7.5) | — | 4332 (29.9) |
| 28 | NaSCN + TEA | .50 + .0125 | 320 (190) | 2.9 | — | −1⅜ | 1119 (7.7) | — | 4113 (28.4) |
| 29 | NaSCN + TEA | .10 + .025 | 323 (192) | 2.9 | — | −1⅜ | 995 (6.9) | — | 4097 (28.2) |
| 30 | NaSCN + TEA | .25 + .025 | 322 (191) | 2.9 | — | −1⅜ | 1010 (7.0) | — | 4047 (27.9) |
| 31 | NaSCN + TEA | .50 + .025 | 314 (186) | 3.1 | — | −1⅜ | 1176 (8.1) | — | 4403 (30.4) |
| 32 | NONE | 0 | 327 (194) | 2.5 | — | +¼ | 644 (4.4) | — | 3894 (26.8) |
| Cement No. 2 | | | | | | | | | |
| 33 | NONE | 0 | 329 (195) | 2.3 | — | 0(8¼) | 515 (3.6) | — | 2825 (19.8) |
| 34 | TEA | .025 | 324 (192) | 3.2 | — | −1 | 760 (5.2) | — | 3300 (22.8) |
| 35 | NaSCN | .10 | 324 (192) | 2.7 | — | −⅞ | 762 (5.3) | — | 2938 (20.3) |
| 36 | NaSCN | .25 | 324 (192) | 2.6 | — | −⅞ | 813 (5.6) | — | 2906 (20.0) |
| 37 | NaSCN | .50 | 326 (193) | 3.0 | — | −⅞ | 804 (5.5) | — | 3141 (21.7) |
| 38 | NaSCN + TEA | .10 + .0125 | 323 (192) | 2.9 | — | −1 | 889 (6.1) | — | 3238 (22.3) |
| 39 | NaSCN + TEA | .25 + .0125 | 322 (191) | 3.1 | — | −⅞ | 917 (6.3) | — | 3275 (22.6) |
| 40 | NaSCN + TEA | .50 + .0125 | 322 (191) | 3.1 | — | −⅞ | 906 (6.2) | — | 3356 (23.1) |
| 41 | NaSCN + TEA | .10 + .025 | 323 (192) | 3.0 | — | −1⅛ | 868 (6.0) | — | 3485 (24.0) |
| 42 | NaSCN + TEA | .25 + .025 | 321 (190) | 3.1 | — | −1¼ | 921 (6.3) | — | 3425 (23.6) |
| 43 | NaSCN + TEA | .50 + .025 | 317 (188) | 3.1 | — | −1¼ | 971 (6.7) | — | 3535 (24.4) |
| 44 | NONE | 0 | 324 (192) | 2.8 | — | +⅛ | 530 (3.7) | — | 2888 (19.9) |
| | | | SERIES B | | | | | | |
| Cement No. 1 | | | | | | | | | |
| 45 | NONE | 0 | 327 (194) | 1.9 | — | 0(8¼) | 753 (5.2) | — | 3868 (26.7) |
| 46 | CaCl₂ | 1.0 | 314 (186) | 2.4 | — | −2¼ | 1165 (8.0) | — | 4266 (29.4) |

TABLE II-continued

| Mix No. | Additive | Dose; percent by weight of cement | Water lbs/cu.yd (kg/cu.meter) | Air Vol. % | Rate of Hardening Relative To First Plain (None) Mix[1] Hours Initial Set | Final Set | Compressive Strength; p.s.i. (MPa) 1 day | 7 day | 28 days |
|---|---|---|---|---|---|---|---|---|---|
| 47 | TEA | .025 | 312 (185) | 2.8 | — | −1¼ | 967 (6.7) | — | 4343 (29.9) |
| 48 | NaSCH | .75 | 320 (190) | 2.1 | — | −1¼ | 1144 (7.9) | — | 4104 (28.3) |
| 49 | NaSCN | 1.0 | 318 (189) | 2.2 | — | −1⅜ | 1153 (7.9) | — | 4134 (28.5) |
| 50 | NaSCN | 1.25 | 312 (185) | 2.5 | — | −1⅜ | 1195 (8.2) | — | 4193 (28.9) |
| 51 | NaSCN + TEA | .75 + .025 | 315 (187) | 2.7 | — | −1⅜ | 1311 (9.0) | — | 4588 (31.6) |
| 52 | NaSCN + TEA | 1.0 + .025 | 319 (189) | 2.6 | — | −1⅜ | 1284 (8.9) | — | 4465 (30.8) |
| 53 | NaSCN + TEA | 1.25 + .025 | 312 (185) | 2.6 | — | −1⅜ | 1330 (9.2) | — | 4624 (31.9) |
| 54 | NONE | 0 | 325 (193) | 1.8 | — | +⅜ | 757 (5.2) | — | 3911 (27.0) |

Cement No. 2

| Mix No. | Additive | Dose | Water | Air Vol. % | Initial Set | Final Set | 1 day | 7 day | 28 days |
|---|---|---|---|---|---|---|---|---|---|
| 55 | NONE | 0 | 332 (197) | 1.8 | — | 0 (8¾) | 794 (5.5) | — | 3726 (25.7) |
| 56 | CaCl₂ | 1.0 | 327 (194) | 1.9 | — | −1⅜ | 1039 (7.2) | — | 3985 (27.5) |
| 57 | TEA | .025 | 328 (915) | 2.1 | — | −1¼ | 1002 (6.9) | — | 4097 (28.2) |
| 58 | NaSCN | .75 | 322 (191) | 2.2 | — | −1¼ | 1174 (8.1) | — | 4180 (28.8) |
| 59 | NaSCN | 1.0 | 321 (190) | 2.1 | — | −1¼ | 1156 (8.0) | — | 4099 (28.3) |
| 60 | NaSCN | 1.25 | 326 (193) | 2.2 | — | −1⅜ | 1124 (7.7) | — | 3896 (26.9) |
| 61 | NaSCN + TEA | .75 + .025 | 322 (191) | 2.4 | — | −1⅜ | 1260 (8.7) | — | 4255 (29.3) |
| 62 | NaSCN + TEA | 1.0 + .025 | 317 (188) | 2.7 | — | −1⅜ | 1314 (9.1) | — | 4366 (30.1) |
| 63 | NaSCN + TEA | 1.25 + .025 | 320 (190) | 2.5 | — | −1⅜ | 1292 (8.9) | — | 4326 (29.8) |
| 64 | NONE | 0 | 333 (198) | 1.6 | — | +⅝ | 757 (5.2) | — | 3650 (25.2) |

SERIES C

Cement No. 1

| Mix No. | Additive | Dose | Water | Air Vol. % | Initial Set | Final Set | 1 day | 7 day | 28 days |
|---|---|---|---|---|---|---|---|---|---|
| 65 | NONE | 0 | 326 (193) | 1.8 | 0 (5¼) | 0 (7¼) | 751 (5.2) | — | 3569 (24.6) |
| 66 | KSCN | .50 | 324 (192) | 1.8 | −⅜ | −⅞ | 998 (6.9) | — | 3963 (27.3) |
| 67 | KSCN | .60 | 322 (191) | 1.8 | −⅞ | −1 | 1043 (7.2) | — | 3915 (27.0) |
| 68 | KSCN | .70 | 324 (192) | 1.8 | −¼ | −⅞ | 1078 (7.4) | — | 3856 (26.6) |
| 69 | KSCN + TEA | .5 + .02 | 322 (191) | 2.1 | −1 | −1¼ | 989 (6.8) | — | 4147 (28.6) |
| 70 | KSCN + TEA | .6 + .02 | 319 (189) | 2.1 | −1 | −⅞ | 1231 (8.5) | — | 4184 (28.8) |
| 71 | KSCN + TEA | .7 + .02 | 317 (188) | 2.2 | −1 | −1¼ | 1321 (9.1) | — | 4349 (30.0) |
| 72 | KSCN + TEA | 1.0 + .04 | 316 (187) | 2.5 | −⅞ | −⅞ | 1310 (9.0) | — | 4102 (28.3) |
| 73 | KSCN + TEA | 1.2 + .04 | 314 (186) | 2.6 | −⅞ | −1⅜ | 1296 (8.9) | — | 4140 (28.5) |
| 74 | CaCl₂ | 1.0 | 320 (190) | 1.9 | −1¼ | −1⅜ | 1131 (7.8) | — | 3901 (26.9) |
| 75 | NONE | 0 | 326 (193) | 1.8 | +¼ | +¼ | 757 (5.2) | — | 3484 (24.0) |

Cement No. 2

| Mix No. | Additive | Dose | Water | Air Vol. % | Initial Set | Final Set | 1 day | 7 day | 28 days |
|---|---|---|---|---|---|---|---|---|---|
| 76 | NONE | 0 | 326 (193) | 1.5 | 0 (5¾) | 0 (8) | 805 (5.5) | — | 3486 (24.0) |
| 77 | KSCN | .50 | 319 (189) | 1.7 | −1 | −1⅜ | 1164 (8.0) | — | 3826 (26.4) |
| 78 | KSCN | .60 | 315 (187) | 1.7 | −1 | −1⅜ | 1176 (8.1) | — | 3723 (25.7) |
| 79 | KSCN | .70 | 315 (187) | 1.6 | −1 | −1⅜ | 1155 (8.0) | — | 3841 (26.5) |
| 80 | KSCN + TEA | .50 + .02 | 315 | 1.9 | −1⅜ | −1⅜ | 1356 | — | 4072 |

TABLE II-continued

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| 81 | KSCN + TEA | .60 + .02 | 319 (187) | 1.7 | −1¼ | −2 | 1259 (9.3) | — | 4052 (28.1) |
| 82 | KSCN + TEA | .70 + .02 | 317 (189) | 1.90 | −1¼ | −2 | 1265 (8.7) | — | 3965 (27.9) |
| 83 | KSCN + TEA | 1.0 + .04 | 315 (188) | 2.0 | −1¼ | −1¾ | 1276 (8.7) | — | 3947 (27.3) |
| 84 | KSCN + TEA | 1.2 + .04 | 315 (187) | 1.7 | −1¼ | −2 | 133 (8.8) | — | 4227 (27.2) |
| 85 | CaCl₂ | 1.0 | 319 (187) | 1.7 | −1¾ | −2½ | 1067 (9.2) | — | 3910 (29.1) |
| 86 | NONE | 0 | 327 (189) | 1.6 | +¼ | +1 | 806 (7.4) | — | 3456 (27.0) |
| | | | (194) | | | | (5.6) | | (23.8) |

SERIES D

Cement No. 1

| 87 | NONE | 0 | 314 (186) | 1.7 | 0 (6¼) | 0 (8¼) | 619 (4.3) | — | 3960 (27.3) |
|---|---|---|---|---|---|---|---|---|---|
| 88 | CaCl₂ | 1.0 | 304 (180) | 1.8 | −1¼ | −1¾ | 994 (6.9) | — | 4155 (28.6) |
| 89 | NaSCN + TEA | .5 + .02 | 294 (174) | 2.2 | −1¼ | −1¼ | 1079 (7.4) | — | 4500 (31.0) |
| 90 | NaSCN + TEA | .75 + .03 | 293 (174) | 2.5 | −1¼ | −1¼ | 1076 (7.4) | — | 4569 (31.5) |
| 91 | Ca(SCN)₂ + TEA | .5 + .02 | 298 (177) | 2.2 | −1¼ | −1¾ | 1080 (7.4) | — | 4569 (31.5) |
| 92 | Ca(SCN)₂ + TEA | .75 + .03 | 302 (179) | 1.9 | −1 | −1¾ | 994 (6.9) | — | 4494 (31.0) |
| 93 | NaSCN | .5 | 299 (177) | 1.8 | −⅞ | −1¼ | 896 (6.2) | — | 4206 (29.0) |
| 94 | Ca(SCN)₂ | .5 | 302 (179) | 1.9 | −¾ | −¾ | 910 (6.3) | — | 4269 (29.4) |

Cement No. 2

| 95 | NONE | 0 | 335 (199) | 1.9 | 0 (6¼) | 0 (9¼) | 619 (4.3) | — | 3649 (25.2) |
|---|---|---|---|---|---|---|---|---|---|
| 96 | CaCl₂ | 1.0 | 322 (191) | 2.1 | −1¾ | −2¼ | 963 (6.6) | — | 3838 (26.5) |
| 97 | NaSCN + TEA | .5 + .02 | 315 (187) | 2.4 | −1¾ | −2 | 1038 (7.2) | — | 4175 (28.8) |
| 98 | NaSCN + TEA | .75 + .03 | 315 (187) | 2.7 | −1¾ | −1¾ | 984 (6.8) | — | 4372 (30.1) |
| 99 | Ca(SCN)₂ + TEA | .5 + .02 | 318 (189) | 2.1 | −1¾ | −2 | 958 (6.6) | — | 4338 (29.9) |
| 100 | Ca(SCN)₂ + TEA | .75 + .03 | 314 (186) | 2.2 | −1¾ | −2¼ | 937 (6.5) | — | 4429 (30.5) |
| 101 | NaSCN | .5 | 320 (190) | 2.1 | −1¾ | −1¼ | 863 (5.9) | — | 3969 (27.4) |
| 102 | Ca(SCN)₂ | .5 | 324 (192) | 1.9 | −1¾ | −1¾ | 825 (5.7) | — | 4083 (28.1) |

SERIES E

Cement No. 1

| 103 | NONE | 0 | 321 (190) | 1.8 | 0 (5½) | 0 (7¾) | 767 (5.3) | 2391 (16.5) | 3847 (26.5) |
|---|---|---|---|---|---|---|---|---|---|
| 104 | NaSCN | .50 | 317 (188) | 1.7 | −¾ | −1 | 1045 (7.2) | 2921 (20.1) | 4000 (27.6) |
| 105 | NaSCN | .70 | 310 (184) | 1.8 | −1 | −1 | 1117 (7.7) | 3183 (21.9) | 4227 (29.1) |
| 106 | KSCN | .60 | 317 (188) | 1.6 | −¾ | −⅞ | 1072 (7.4) | 3046 (21.0) | 4225 (29.1) |
| 107 | KSCN | .84 | 319 (189) | 1.7 | −¾ | −1 | 1077 (7.4) | 2913 (20.1) | 4070 (28.1) |
| 108 | Ca(SCN)₂ | .48 | 317 (188) | 1.5 | −¾ | −⅞ | 996 (6.9) | 2871 (19.8) | 4077 (28.1) |
| 109 | Ca(SCN)₂ | .675 | 315 (187) | 1.5 | −1 | −1 | 1021 (7.0) | 3030 (21.0) | 4437 (30.6) |
| 110 | NH₄SCN | .47 | 319 (189) | 1.4 | −¾ | −¾ | 955 (6.6) | 2768 (19.1) | 4177 (28.8) |
| 111 | NH₄SCN | .66 | 317 (188) | 1.4 | −¾ | −¾ | 943 (6.5) | 2976 (20.5) | 4106 (28.3) |
| 112 | CaCl₂ | 1.0 | 323 (191) | 1.8 | −1¼ | −1¾ | 1027 (7.1) | 2874 (19.8) | 3931 (27.1) |

TABLE II-continued

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| Cement No. 2 | | | | | | | | | |
| 113 | NONE | 0 | 325 (193) | 1.9 | 0 (5¾) | 0 (7¼) | 711 (4.9) | 2329 (16.1) | 3949 (27.2) |
| 114 | NaSCN | .50 | 319 (189) | 2.0 | −⅞ | −1⅛ | 947 (6.5) | 2830 (19.5) | 4215 (29.1) |
| 115 | NaSCN | .70 | 315 (187) | 2.1 | −⅞ | −1¼ | 1028 (7.1) | 2989 (20.6) | 4152 (28.6) |
| 116 | KSCN | .60 | 314 (186) | 2.0 | −⅞ | −1⅛ | 991 (6.8) | 2869 (19.8) | 4265 (29.4) |
| 117 | KSCN | .84 | 313 (186) | 2.0 | −⅞ | −1⅜ | 1029 (7.1) | 2871 (19.8) | 4410 (30.4) |
| 118 | Ca(SCN)₂ | .48 | 314 (186) | 2.1 | −⅞ | −1⅜ | 937 (6.5) | 2772 (19.1) | 4430 (30.5) |
| 119 | Ca(SCN)₂ | .675 | 312 (185) | 1.9 | −⅞ | −1⅜ | 944 (6.5) | 2885 (19.9) | 4439 (30.6) |
| 120 | NH₄SCN | .47 | 313 (186) | 2.2 | −⅞ | −1⅜ | 931 (6.4) | 2908 (20.0) | 4371 (30.1) |
| 121 | NH₄SCN | .66 | 314 (186) | 2.0 | −⅞ | −1¼ | 912 (6.3) | 2861 (19.7) | 4499 (31.0) |
| 122 | CaCl₂ | 1.0 | 315 (187) | 2.2 | −1⅜ | −1⅞ | 1016 (7.0) | 2972 (20.5) | 4298 (29.6) |

TABLE III

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| Cement No. 1 | | | | | | | | | |
| 123 | NONE | 0 | 311 (184) | 1.7 | 0 (11½) | 0 (17⅞) | 176 (1.2) | — | — |
| 124 | NaSCN + TEA | 0.5 + 0.02 | 305 (181) | 2.0 | −4¼ | −6⅞ | 523 (3.6) | — | — |
| 125 | NaSCN + TEA | 0.75 + 0.03 | 305 (181) | 2.2 | −3⅞ | −5⅞ | 480 (3.3) | — | — |
| 126 | CaCl₂ | 1.0 | 305 (181) | 2.2 | −4¼ | −6⅞ | 386 (2.7) | — | — |
| Cement No. 2 | | | | | | | | | |
| 127 | NONE | 0 | 315 (187) | 1.7 | 0 (8) | 0 (13¾) | 145 (1.0) | — | — |
| 128 | NaSCN + TEA | 0.5 + 0.02 | 305 (181) | 1.9 | −1½ | −3⅞ | 344 (2.4) | — | — |
| 129 | NaSCN + TEA | 0.75 + 0.03 | 305 (181) | 2.0 | −1½ | −3⅞ | 346 (2.4) | — | — |
| 130 | CaCl₂ | 1.0 | 305 (181) | 2.0 | −1½ | −3¼ | 383 (2.6) | — | — |

TABLE IV

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| Cement No. 1 | | | | | | | | | |
| 131 | NONE | 0 | 320 (190) | 2.3 | 0 (5¼) | 0 (8¼) | 675 (4.7) | — | — |
| 132 | NaSCN | .5 | 316 (187) | 2.6 | −1 | −⅞ | 996 (6.9) | — | — |
| 133 | TEA | .02 | 312 (185) | 2.6 | −⅞ | −1 | 854 (5.9) | — | — |
| 134 | DEA | .02 | 315 (187) | 2.4 | −¼ | −¼ | 700 (4.8) | — | — |
| 135 | MEA | .02 | 317 (188) | 2.3 | −¼ | −⅞ | 679 (4.7) | — | — |
| 136 | NaSCN + TEA | .5 + .005 | 312 (185) | 2.7 | −⅞ | −1 | 999 (6.9) | — | — |
| 137 | NaSCN + TEA | .5 + .02 | 312 | 2.8 | −1½ | −2 | 1158 | — | — |

TABLE IV-continued

| Mix No. | Additive | Dose; percent by weight of cement | Water lbs/cu.yd (kg/cu.meter) | Air Vol. % | Rate of Hardening Relative To First Plain (None) Mix[1] Hours Initial Set | Final Set | Compressive Strength; p.s.i. (MPa) 1 day | 7 day | 28 days |
|---|---|---|---|---|---|---|---|---|---|
| | | | (185) | | | | (8.0) | | |
| 138 | NaSCN + DEA | .5 + .005 | 313 (186) | 2.6 | −1 | −1¼ | 1013 (7.0) | — | — |
| 139 | NaSCN + DEA | .5 + .02 | 317 (188) | 2.4 | −¾ | −1¼ | 861 (5.9) | — | — |
| 140 | NaSCN + MEA | .5 + .005 | 316 (187) | 2.3 | −⅞ | −1¼ | 923 (6.4) | — | — |
| 141 | NaSCN + MEA | .5 + .02 | 315 (187) | 2.4 | −⅝ | −1 | 938 (6.5) | — | — |
| Cement No. 2 | | | | | | | | | |
| 142 | NONE | 0 | 319 (189) | 2.2 | 0 (6) | 0 (8¾) | 638 (4.4) | — | — |
| 143 | NaSCN | .5 | 315 (187) | 2.4 | −¾ | −1¼ | 929 (6.4) | — | — |
| 144 | TEA | .02 | 310 (184) | 2.7 | −¾ | −1¼ | 819 (5.6) | — | — |
| 145 | DEA | .02 | 311 (184) | 2.4 | −⅛ | −⅜ | 702 (4.8) | — | — |
| 146 | MEA | .02 | 313 (186) | 2.5 | 0 | −¼ | 724 (5.0) | — | — |
| 147 | NaSCN + TEA | .5 + .005 | 308 (183) | 2.6 | −1¼ | −1⅞ | 1029 (7.1) | — | — |
| 148 | NaSCN + TEA | .5 + .02 | 313 (186) | 2.4 | −1¼ | −1¾ | 1091 (7.5) | — | — |
| 149 | NaSCN + DEA | .5 + .005 | 315 (187) | 2.3 | −¾ | −1⅜ | 931 (6.4) | — | — |
| 150 | NaSCN + DEA | .5 + .02 | 312 (185) | 2.2 | −1 | −1¼ | 946 (6.6) | — | — |
| 151 | NaSCN + MEA | .5 + .005 | 314 (186) | 2.3 | −¾ | −1⅜ | 944 (6.5) | — | — |
| 152 | NaSCN + MEA | .5 + .02 | 312 (185) | 2.3 | −⅞ | −1¼ | 943 (6.5) | — | — |

TABLE V

| Mix No. | Additive | Dose; percent by weight of cement | Water lbs/cu.yd (kg/cu.meter) | Air Vol. % | Rate of Hardening Relative To First Plain (None) Mix[1] Hours Initial Set | Final Set | Compressive Strength; p.s.i. (MPa) 1 day | 7 day | 28 days |
|---|---|---|---|---|---|---|---|---|---|
| | | | SERIES A | | | | | | |
| Cement No. 1 | | | | | | | | | |
| 153 | NONE | 0 | 332 (197) | 1.8 | 0 (5¼) | 0 (8) | 710 (4.9) | 2378 (16.4) | 3672 (25.3) |
| 154 | CaLS | .15 | 306 (182) | 3.2 | +⅜ | +¼ | 805 (5.5) | 2738 (18.9) | 4159 (28.7) |
| 155 | TEA | .015 | 323 (191) | 2.2 | −⅜ | −⅜ | 777 (5.4) | 2654 (18.3) | 3968 (27.4) |
| 156 | KSCN | .10 | 324 (195) | 2.0 | −¼ | −⅜ | 883 (6.1) | 2670 (18.4) | 3738 (25.8) |
| 157 | TEA + CaLS | .015 + .15 | 308 (183) | 3.5 | −⅛ | −⅛ | 783 (5.4) | 2838 (19.6) | 4207 (29.0) |
| 158 | KSCN + TEA + CaLS | .10 + .015 + .15 | 305 (181) | 3.5 | −⅛ | −⅛ | 1074 (7.4) | 3287 (22.7) | 4485 (30.9) |
| 159 | KSCN | .50 | 329 (195) | 1.8 | −⅛ | −⅛ | 973 (6.7) | 2766 (19.1) | 3794 (26.2) |
| 160 | KSCN + TEA + CaLS | .50 + .015 + .15 | 309 (183) | 3.3 | −¼ | −⅛ | 1143 (7.9) | 3219 (22.2) | 4201 (29.0) |
| 161 | NONE | 0 | 334 (198) | 1.8 | +¼ | 0 | 651 (4.5) | 2386 (16.4) | 3585 (24.7) |
| Cement No. 2 | | | | | | | | | |
| 162 | NONE | 0 | 338 (198) | 1.5 | 0 (6) | 0 (8¾) | 735 (5.1) | 2363 (16.3) | 3263 (22.5) |
| 163 | CaLS | .15 | 311 (184) | 2.9 | +¼ | +⅜ | 776 (5.3) | 2643 (18.2) | 3732 (25.7) |
| 164 | TEA | .015 | 332 (197) | 1.9 | −¼ | −⅞ | 862 (5.9) | 2562 (17.7) | 3793 (26.1) |
| 165 | KSCN | .10 | 329 (195) | 1.7 | −⅝ | −⅝ | 964 (6.6) | 2702 (18.6) | 3605 (24.9) |
| 166 | TEA + CaLS | .015 + .15 | 307 (182) | 3.4 | +¼ | −¼ | 912 (6.3) | 2905 (20.0) | 4000 (27.6) |
| 167 | KSCN + TEA + CaLS | .10 + .015 + .15 | 308 (183) | 3.5 | −⅜ | −⅝ | 1121 (7.7) | 3170 (21.9) | 4049 (27.9) |

TABLE V-continued

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| 168 | KSCN | .50 | 331 (196) | 1.8 | −¾ | −1¼ | 993 (6.8) | 2765 (19.1) | 3649 (25.2) |
| 169 | KSCN + TEA + CaLS | .50 + .015 + .15 | 309 (183) | 3.4 | −⅜ | −¾ | 1189 (8.2) | 3182 (21.9) | 4016 (27.7) |
| 170 | NONE | 0 | 329 (195) | 1.8 | +¼ | −½ | 730 (5.0) | 2426 (16.7) | 3335 (23.0) |
| *SERIES B* | | | | | | | | | |
| *Cement No. 1* | | | | | | | | | |
| 171 | NONE | 0 | 323 (191) | 1.8 | 0 (5¾) | 0 (8) | 690 (4.8) | — | 3394 (23.4) |
| 172 | NaSCN + TEA + CaLS | .20 + .02 + .225 | 273 (162) | 4.8 | +¾ | 0 | 1194 (8.2) | — | 4660 (32.1) |
| 173 | NaSCN + TEA + CaLS | .30 + .03 + .30 | 262 (155) | 6.0 | +1¼ | +¾ | 1168 (8.1) | — | 4560 (31.4) |
| 174 | NaSCN + TEA + CaLS | .30 + .01 + .15 | 286 (170) | 3.6 | +¼ | −⅜ | 1235 (8.5) | — | 4632 (31.9) |
| 175 | NaSCN + TEA + CaLS | .10 + .03 + .15 | 284 (168) | 4.2 | +¼ | −⅜ | 1094 (7.5) | — | 4576 (31.5) |
| 176 | NaSCN + TEA + CaLS | .10 + .01 + .15 | 294 (174) | 3.4 | −¼ | −½ | 1096 (7.6) | — | 4453 (30.7) |
| 177 | NaSCN + TEA + CaLS | .10 + .03 + .30 | 263 (156) | 6.2 | +1 | +⅝ | 1038 (7.2) | — | 4441 (30.6) |
| 178 | NaSCN + TEA + CaLS | .10 + .01 + .30 | 266 (158) | 6.0 | +1¼ | +1¼ | 1016 (7.0) | — | 4324 (29.8) |
| 179 | NaSCN + TEA + CaLS | .30 + .03 + .15 | 286 (170) | 4.1 | −¼ | −⅝ | 1162 (8.0) | — | 4424 (30.5) |
| 180 | NaSCN + TEA + CaLS | .30 + .01 + .30 | 266 (158) | 5.4 | +¼ | +⅝ | 1095 (7.5) | — | 4758 (32.8) |
| *Cement No. 2* | | | | | | | | | |
| 181 | NONE | 0 | 320 (190) | 1.6 | 0 (6) | 0 (8¾) | 762 (5.3) | — | 3728 (25.7) |
| 182 | NaSCN + TEA + CaLS | .20 + .02 + .225 | 274 (163) | 4.8 | +⅝ | 0 | 1319 (9.1) | — | 4795 (33.1) |
| 183 | NaSCN + TEA + CaLS | .30 + .03 + .30 | 262 (155) | 5.7 | +¾ | +⅝ | 1348 (9.3) | — | 4720 (32.5) |
| 184 | NaSCN + TEA + CaLS | .30 + .01 + .15 | 284 (168) | 3.5 | −⅜ | −⅜ | 1347 (9.3) | — | 4529 (31.2) |
| 185 | NaSCN + TEA + CaLS | .10 + .03 + .15 | 282 (167) | 3.6 | −¼ | −⅜ | 1326 (9.1) | — | 4505 (31.1) |
| 186 | NaSCN + TEA + CaLS | .10 + .01 + .15 | 283 (168) | 3.5 | −¼ | −⅜ | 1278 (8.8) | — | 4474 (30.8) |
| 187 | NaSCN + TEA + CaLS | .10 + .03 + .30 | 277 (164) | 5.0 | +1 | +⅝ | 1266 (8.7) | — | 4756 (32.8) |
| 188 | NaSCN + TEA + CaLS | .10 + .01 + .30 | 260 (154) | 6.0 | +1⅜ | +⅝ | 1227 (8.5) | — | 4629 (31.9) |
| 189 | NaSCN + TEA + CaLS | .30 + .03 + .15 | 282 (167) | 3.7 | −⅜ | −1 | 1403 (9.7) | — | 4768 (32.9) |
| 190 | NaSCN + TEA + CaLS | .30 + .01 + .30 | 253 (150) | 5.8 | +¾ | 0 | 1297 (8.9) | — | 4578 (31.6) |

TABLE VI

| Mix No. | Additive | Dose; percent by weight of cement | Water lbs/cu.yd (kg/cu.meter) | Air Vol. % | Rate of Hardening Relative To First Plain (None) Mix[1] Hours | | Compressive Strength; p.s.i. (MPa) | | |
|---|---|---|---|---|---|---|---|---|---|
| | | | | | Initial Set | Final Set | 1 day | 7 day | 28 days |
| *SERIES A* | | | | | | | | | |
| *Cement No. 1* | | | | | | | | | |
| 191 | NONE | 0 | 335 (199) | 2.0 | — | 0 (7½) | 764 (5.3) | — | 3403 (23.5) |
| 192 | NaSCN | .50 | 331 (196) | 2.3 | — | −1 | 1073 (7.4) | — | 3796 (26.2) |
| 193 | TEA | .025 | 329 (195) | 2.8 | — | −1¼ | 1002 (6.9) | — | 3803 (26.2) |
| 194 | Na₂S₂O₃ | .25 | 325 (193) | 2.4 | — | −½ | 801 (5.5) | — | 3556 (24.5) |
| 195 | Na₂S₂O₃ | .50 | 322 (191) | 2.9 | — | −⅝ | 843 (5.8) | — | 3643 (25.1) |
| 196 | NaSCN + Na₂S₂O₃ | .5 + .5 | 323 (191) | 2.8 | — | −1¼ | 1166 (8.0) | — | 3665 (25.3) |
| 197 | NaSCN + TEA + Na₂S₂O₃ | .5 + .025 + .5 | 321 (190) | 3.1 | — | −1⅜ | 1254 (8.6) | — | 3843 (26.5) |

TABLE VI-continued

| Mix No. | Additive | Dose; percent by weight of cement | Water lbs/cu.yd (kg/cu.meter) | Air Vol. % | Hours Initial Set | Hours Final Set | 1 day | 7 day | 28 days |
|---|---|---|---|---|---|---|---|---|---|
| 198 | NaSCN + Na$_2$S$_2$O$_3$ | .5 + .25 | 324 (192) | 2.5 | — | −1⅝ | 1167 (8.0) | — | 3920 (27.0) |
| 199 | NaSCN + TEA + Na$_2$S$_2$O$_3$ | .5 + .025 + .25 | 321 (190) | 2.9 | — | −1⅝ | 1242 (8.6) | — | 4159 (28.7) |
| 200 | CaCl$_2$ | 1.0 | 328 (195) | 2.4 | — | −2 | 1091 (7.5) | — | 3804 (26.2) |
| 201 | NONE | 0 | 331 (196) | 2.1 | — | +¼ | 759 (5.2) | — | 3500 (24.1) |
| Cement No. 2 | | | | | | | | | |
| 202 | NONE | 0 | 328 (195) | 2.1 | — | (8¼) | 733 (5.1) | — | 4130 (28.5) |
| 203 | NaSCN | .50 | 319 (189) | 2.6 | — | −1¼ | 988 (6.8) | — | 4319 (29.8) |
| 204 | TEA | .025 | 320 (190) | 2.8 | — | −1 | 1022 (7.0) | — | 4360 (30.1) |
| 205 | Na$_2$S$_2$O$_3$ | .25 | 321 (190) | 2.6 | — | −¼ | 761 (5.2) | — | 4388 (30.3) |
| 206 | Na$_2$S$_2$O$_3$ | .5 | 320 (190) | 2.8 | — | −⅝ | 764 (5.3) | — | 4231 (29.2) |
| 207 | NaSCN + Na$_2$S$_2$O$_3$ | .5 + .5 | 312 (185) | 3.0 | — | −1⅝ | 1174 (8.1) | — | 4375 (30.2) |
| 208 | NaSCN + TEA + Na$_2$S$_2$O$_3$ | .5 + .025 + .5 | 320 (190) | 2.9 | — | −2¼ | 1292 (8.9) | — | 4405 (30.4) |
| 209 | NaSCN + Na$_2$S$_2$O$_3$ | .5 + .25 | 320 (190) | 2.4 | — | −1¾ | 1130 (7.8) | — | 4354 (30.0) |
| 210 | NaSCN + TEA + Na$_2$S$_2$O$_3$ | .5 + .025 + .25 | 319 (189) | 3.1 | — | −2¼ | 1200 (8.3) | — | 4319 (29.8) |
| 211 | CaCl$_2$ | 1.0 | 323 (191) | 2.5 | — | −2¼ | 1032 (7.1) | — | 4463 (30.8) |
| 212 | NONE | 0 | 326 (193) | 2.1 | — | +¼ | 724 (5.0) | — | 4066 (28.0) |
| SERIES B | | | | | | | | | |
| Cement No. 1 | | | | | | | | | |
| 213 | NONE | 0 | 314 (186) | 1.9 | 0 (5¼) | 0 (7¾) | 761 (5.2) | — | 3701 (25.5) |
| 214 | CaCl$_2$ | .5 | 308 (183) | 1.9 | −⅛ | −1¼ | 1051 (7.2) | — | 3894 (26.8) |
| 215 | CaCl$_2$ | 1.0 | 307 (182) | 1.9 | −1¼ | −2¼ | 1167 (8.0) | — | 3928 (27.1) |
| 216 | NaSCN | .25 | 309 (183) | 2.0 | −⅝ | −1¼ | 1058 (7.3) | — | 3935 (27.1) |
| 217 | NaSCN | .50 | 305 (181) | 2.1 | −¾ | −1⅝ | 1125 (7.8) | — | 3986 (27.5) |
| 218 | NaSCN + CaCl$_2$ | .25 + .5 | 310 (184) | 2.1 | −⅞ | −1⅝ | 1032 (7.1) | — | 3838 (26.5) |
| 219 | NaSCN + CaCl$_2$ | .5 + .5 | 305 (181) | 2.0 | −1¼ | −1⅝ | 1110 (7.7) | — | 3866 (26.7) |
| 220 | NaSCN + CaCl$_2$ | .25 + 1.0 | 311 (184) | 2.0 | −1¼ | −2¼ | 1121 (7.7) | — | 3906 (26.9) |
| 221 | NaSCN + CaCl$_2$ | .25 + 1.0 | 309 (183) | 2.0 | −1⅜ | −2¼ | 1125 (7.8) | — | 3961 (27.3) |
| Cement No. 2 | | | | | | | | | |
| 222 | NONE | 0 | 315 (187) | 1.8 | 0 (5¼) | 0 (7¾) | 763 (5.3) | — | 3863 (26.6) |
| 223 | CaCl$_2$ | .5 | 317 (188) | 1.8 | −¾ | −1¼ | 983 (6.8) | — | 4095 (28.2) |
| 224 | CaCl$_2$ | 1.0 | 314 (186) | 1.9 | −1¼ | −2¼ | 1017 (7.0) | — | 4140 (28.5) |
| 225 | NaSCN | .25 | 313 (186) | 2.0 | — | −1¼ | 923 (6.4) | — | 4118 (28.4) |
| 226 | NaSCN | .50 | 314 (186) | 1.9 | −½ | −1 | 933 (6.4) | — | 4160 (28.7) |
| 227 | NaSCN + CaCl$_2$ | .25 + .5 | 314 (186) | 1.8 | −1 | −1⅝ | 1055 (7.3) | — | 4081 (28.1) |
| 228 | NaSCN + CaCl$_2$ | .5 + .5 | 312 (185) | 2.1 | −½ | −2 | 1075 (7.4) | — | 4041 (27.9) |
| 229 | NaSCN + CaCl$_2$ | .25 + 1.0 | 311 (184) | 2.0 | −1¼ | −2¾ | 1059 (7.3) | — | 4063 (28.0) |
| 230 | NaSCN + CaCl$_2$ | .5 + 1.0 | 314 (186) | 2.0 | −1⅜ | −2¼ | 1110 (7.7) | — | 4181 (28.8) |

It is also within the scope of the invention to employ the admixture of the present invention together with known set retarders, such as lignosulfonates, sugars, glucosacchardes, and the like, or combinations thereof to obtain improvement in the compressive strength of the hardened mix, but with less retarding effect than would result from such set retarders. The accelerators of the present invention and said known set retarders can also be employed together with conventional set accelerators as mentioned above to achieve a desired combination of benefits.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

I claim:

1. A hydraulic cement mix comprising a hydraulic cement, aggregate in an amount of up to 80% by weight based upon the total weight of said cement mix, sufficient water to effect hydraulic setting of the cement, and an additive comprising a mixture of an alkali and/or alkaline earth or ammonium salt of thiocyanic acid in an amount of between 0.05% and 2.5% by weight based upon the weight of the cement and an alkanolamine in an amount of between 0.001% and 0.05% by weight based upon the weight of the cement, whereby the rate of hardening of said cement mix is accelerated and the early compressive strength of the hardened mix is increased.

2. A hydraulic cement mix in accordance with claim 1, wherein said hydraulic cement comprises portland cement.

3. A hydraulic cement mix in accordance with claim 1, wherein said salt of thiocyanate is present in an amount of between 0.5% and 1.5% by weight based upon the weight of the cement and said alkanolamine is present in an amount of between 0.01% and 0.04% by weight based upon the weight of the cement.

4. A hydraulic cement mix in accordance with claim 1, wherein said salt of thiocyanic acid is sodium thiocyanate.

5. A hydraulic cement mix in accordance with claim 1, wherein said salt of thiocyanic acid is potassium thiocyanate.

6. A hydraulic cement mix in accordance with claim 1, wherein said salt of thiocyanic acid is calcium thiocyanate.

7. A hydraulic cement mix in accordance with claim 1, wherein said salt of thiocyanic acid is magnesium thiocyanate.

8. A hydraulic cement mix in accordance with claim 1, wherein said aggregate is present in an amount of from 20% to 80% by weight.

9. A hydraulic cement mix in accordance with claim 1, wherein said alkanolamine comprises triethanolamine.

10. A process for accelerating the hardening of hydraulic cement mixes which include hydraulic cement, aggregate in an amount of up to 80% by weight based upon the total weight of said cement mix, and sufficient water to effect hydraulic setting of the cement, comprising incorporating an additive comprising a mixture of an alkali, alkaline earth or ammonium salt of thiocyanic acid in an amount of between 0.05% and 2.5% by weight based upon the weight of the cement and an alkanolamine in an amount of between 0.001% and 0.05% by weight based upon the weight of the cement, whereby the rate of hardening of said cement mix is accelerated and the early compressive strength of the hardened mix is increased.

11. A process in accordance with claim 10, wherein said hydraulic cement comprises portland cement.

12. A process in accordance with claim 10, wherein said salt of thiocyanate is present in an amount of between 0.5% and 1.5% by weight based upon the weight of the cement and said alkanolamine is present in an amount of between 0.01% and 0.04% by weight based upon the weight of the cement.

13. A process in accordance with claim 10, wherein said salt of thiocyanic acid is sodium thiocyanate.

14. A process in accordance with claim 10, wherein said salt of thiocyanic acid is potassium thiocyanate.

15. A process in accordance with claim 10, wherein said salt of thiocyanic acid is calcium thiocyanate.

16. A process in accordance with claim 10, wherein said salt of thiocyanic acid is magnesium thiocyanate.

17. A process in accordance with claim 10, wherein said aggregate is present in an amount of from 20% to 80% by weight.

18. A process in accordance with claim 10, wherein said alkanolamine comprises triethanolamine.

* * * * *